(No Model.)
J. MATZINGER.
CAR FENDER AND BRAKE.
No. 563,606. Patented July 7, 1896.
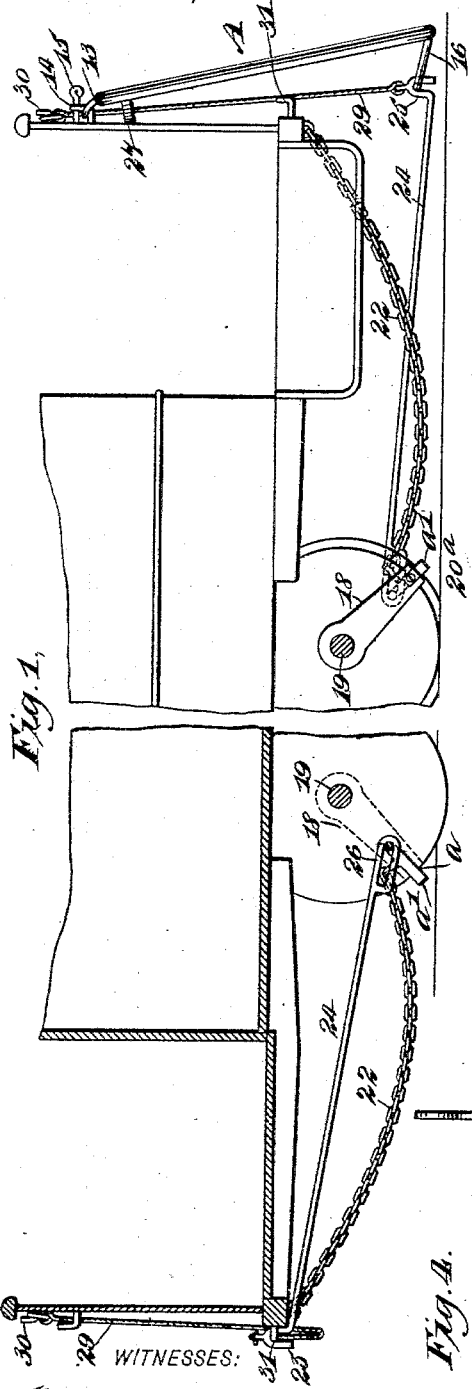
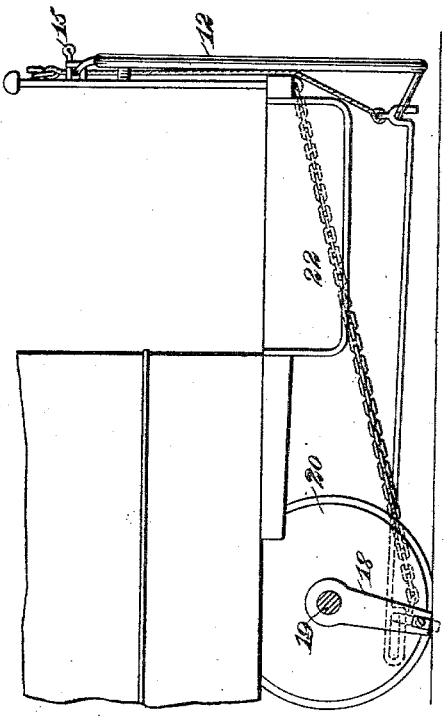
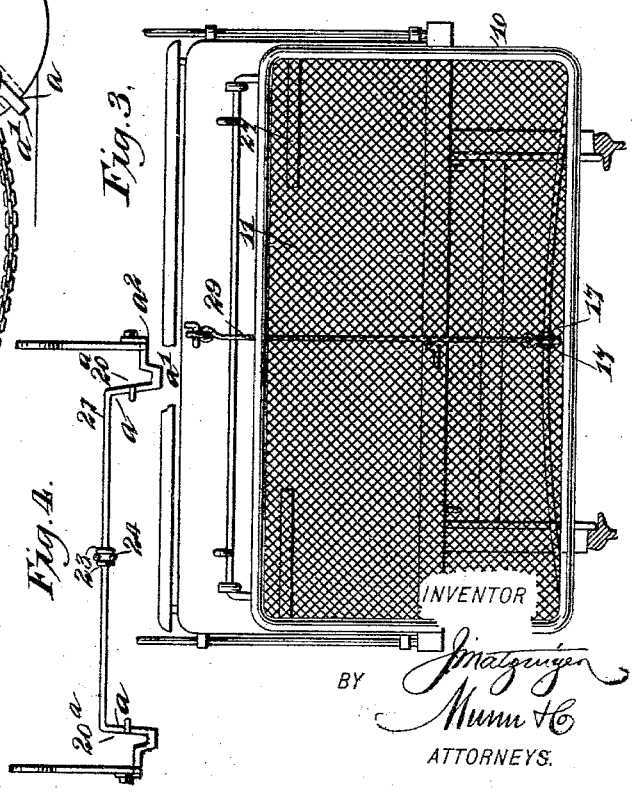
WITNESSES:
Edward Thorpe
INVENTOR
J. Matzinger
BY Munn & Co.
ATTORNEYS.

UNITED STATES PATENT OFFICE.

JOHN MATZINGER, OF MOUNT VERNON, NEW YORK, ASSIGNOR OF ONE-HALF TO OSCAR R. W. WORM, OF NEW YORK, N. Y.

CAR FENDER AND BRAKE.

SPECIFICATION forming part of Letters Patent No. 563,606, dated July 7, 1896.

Application filed August 12, 1895. Serial No. 559,051. (No model.)

*To all whom it may concern:*

Be it known that I, JOHN MATZINGER, of Mount Vernon, in the county of Westchester and State of New York, have invented a new and Improved Car Fender and Brake, of which the following is a full, clear, and exact description.

My invention relates to an improvement in car-fenders, and the object of the invention is to provide a fender for a car which will always be in position for contact with a person or an object that may be on the track; and a further object of the invention is to provide a fender which will serve to prevent a person or object from passing under the car, and which, when struck, will immediately apply brakes to the wheel, instantly stopping the car.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a broken side elevation of a car, the fender being shown as applied to one end, which end is in side elevation, the opposite end of the car from which the fender is removed being in vertical section. Fig. 2 is a side elevation of one end of the car, illustrating the operation of the brake, the fender having presumably met with an obstruction. Fig. 3 is a front elevation of the dashboard and fender of a car; and Fig. 4 is a detail view of the shaft adapted for direct control of the brakes, illustrating also the application of the brakes to the shaft.

In carrying out the invention the fender A is preferably made of rectangular shape, or of such shape as to practically cover the dashboard of the car and extend downward to within a short distance of the ground. The fender in its ordinary construction consists of a skeleton frame 10, upon which a bed 11, of woven wire or other yielding material, is secured, and around the frame proper upon its upper face a cushion 12, of rubber or other material, is secured in any approved manner. Preferably the aforesaid fender at its upper end is provided with a horizontal yoke 13, adapted to extend inwardly or at an angle to its inner face, and this yoke is ordinarily passed over brackets 14, of angular construction, secured to the dashboard of the car, as shown in the drawings, being prevented from leaving said brackets by means of retaining-pins 15 or their equivalents. Thus the fender may be made light and strong, and is capable of being transferred from one end of the car to the other as occasion may demand.

At the bottom of the fender an inwardly-extending horizontal bowed rod 16 is secured, and this rod, at or near its center, is preferably provided with two opposing collars 17, as shown in Fig. 3. With reference to the brake, an arm 18 is pivoted upon an axle 19 at each end, and these arms extend outward from the axle, preferably to an alinement with the inner peripheral portion of the tread of the wheel 20 of the car. Therefore these arms are at the outside of the wheels, and between the wheels a shaft 21 is located, which shaft is provided with a crank-arm $20^a$ at each of its ends, and these crank-arms are adapted to act as brakes, being attached to the pivoted arms 18 carried by the axle.

In forming the crank-arms or brakes $20^a$ the material from which the shaft 21 is made is carried downward and outward at each end, forming a member $a$ at an angle to the shaft proper, and the aforesaid members $a$ of the brakes are given an inclination in an outward direction or away from each other, and the material forming the brakes is then bent horizontally outward, forming a straight or a braking member $a'$, and is thence carried upward and then horizontally outward and again upward to an attachment to a contiguous pivoted arm 18, forming an upper angled member $a^2$, the said arms being preferably slotted at their lower ends to permit these "brake-arms" or "brake-shoes," as they may be properly termed, to pass through them.

The brake shoes or arms are so formed that the flange of the wheel will turn in the depression formed by the dip of the lower horizontal member $a'$, while the straight or horizontal inner portion of the outer member $a^2$ of each brake-shoe will pass over the tread of the wheel. Each brake-shoe is connected by a chain 22, or its equivalent, with preferably the forward portion of the platform of a car, and the brake-shaft 21 is connected at each side of its center with the collar 23, and between these two collars the shank 24 of a hook 25 is pivoted, the shank, where it connects with the brake-shaft, having an eye 26 formed therein in order that it may have lateral movement on the brake-shaft, and the said hook is adapted to engage with the surface of the rod 16 at the bottom of the fender between the collars thereof. The fender is normally held in an outwardly or forwardly inclined position at its lower end by means of springs 27, which may be and preferably are attached to the upper side portions of the fender and engage with the outer face of the dashboard of the car.

When the fender is in its outward or normal position at its lower end, the brake-shaft 21 will have been carried upward, so that the shoes $20^a$ will be in front of the wheels between the top and bottom, or practically in the position shown in Fig. 1, whereby the wheels may be readily revolved independent of the aforesaid shoes. When, however, the fender strikes an object in its path, it is carried inward against the dash of the car and the object is held in front of the fender, and the inward movement of the fender will carry the brake-shaft downward, bringing the brake-shoes beneath the wheels and causing the lower stretch or braking-surface $a'$ of the shoes to engage with the flange of the L-track, which form of track is that usually employed for surface-cars, and consequently by this contact the wheels will be raised from the track; and if the contacting or braking points $a'$ of the shoes are blunt the car will simply slide for a short distance on the track, but if they are sharpened, as preferably they are, said points will enter the metal of the rails to such an extent as to immediately stop the car, assisted by the outer horizontal portions $a^2$ of the brake-shoes, which will engage with the tread of the wheel.

When the fender is removed from one end of the car and placed at the other end, the hook is raised by means of a cable 29 or its equivalent, and made to engage with a keeper 31, located upon the front portion of the car-body, as shown in Fig. 1, and when the hook is in this position the brake-shaft with which it is connected will be held in such manner that its brake-shoes will be free from engagement with the wheels, the cable 29 being attached to any support located on the dashboard—the keeper 30, for example, as shown at the left in Fig. 1.

Having thus described my invention, I claim as new and desire to secure by Letters Patent—

1. The combination with a spring-pressed fender adapted to be supported in front of the dashboard of a car, of a brake-shaft mounted to swing, shoes carried by the said brake-shaft, and adapted to engage with the track-rails a connecting-rod uniting the brake-shaft with the lower portion of the fender, the said connecting-rod being pivoted to the brake-shaft and having sliding movement thereon, and means for limiting the movement of the brake substantially as described.

2. The combination with a spring-pressed fender adapted to be suspended from the dashboard of a car and provided with a bowed rod at its lower end, of a brake-shaft having arms by which it is adapted to be pivoted to the car-axle, shoes carried by said shaft and shaped to conform to the flange and tread of the wheel, and a connecting-rod having a hook at one end to engage the bowed rod on the fender and an elongated eye at the opposite end to connect with the brake-shaft, substantially as described.

3. The combination, with a car, the axle and wheels thereof, of a spring-controlled fender suspended from the dash of the car, a brake-shaft having pivotal connection with the axle, shoes carried by the said shaft and extending over the flange or tread of the wheels, and a connection between the brake-shaft and fender, whereby upon the inward movement of the latter the shoes will be carried and held beneath the tread of the wheels, separating said wheels from the track, substantially as shown and described.

4. The combination, with a car, its axles and wheels, of a spring-controlled fender removably attached to the front of the car, a brake-shaft, substantially parallel with the axle and provided with shoes adapted to be fitted over the peripheral surfaces of the wheels, the said wheels being held to turn loosely in said shoes and arms pivotally connecting the said shoes with the axle, a connecting-rod uniting the shaft with the lower portion of the fender, the connecting-rod having sliding movement on the said shaft, and means for limiting the movement of the brake as and for the purpose specified.

5. The combination, with a car, its axles and wheels, of a spring-controlled fender removably attached to the front of the car, a brake-shaft substantially parallel with the axle, and provided with shoes adapted to be fitted over the peripheral surfaces of the wheels, the said wheels being held to turn loosely in said shoes, arms pivotally connecting the said shoes with the axle, a connecting-rod uniting the shaft with the lower portion of the fender, the connecting-rod having sliding movement on the said shaft, a keeper attached to the car, chains connecting the shoes with the forward portion of the car, and a lifting device attached to the said connecting-rod, as and for the purpose specified.

6. The combination, with a car, its axle and wheels, of a spring-controlled fender removably pivoted upon the dash of the car and extending downward below the under surface of the car, and a bar bowed from the rear lower portion of the fender, of a shaft located between the wheels of the car, substantially parallel with an axle, shoes secured to the ends of the said shaft, crossing and substantially conforming to the peripheral contour of the said wheels, arms attached to the said shoes and pivotally connected with the axle, being located at the outer faces of the wheels, a connection between the shoes and forward portion of the car, a sliding-rod connection between the shoe-shaft and the lower bar of the fender, and means for locking the said connecting medium out of engagement with the said fender, as and for the purpose set forth.

JOHN MATZINGER.

Witnesses:
J. FRED. ACKER,
C. SEDGWICK.